United States Patent
Roberts

(10) Patent No.: US 10,956,058 B2
(45) Date of Patent: Mar. 23, 2021

(54) TIERED STORAGE SYSTEM WITH TIER CONFIGURATION BY PEER STORAGE DEVICES

(71) Applicant: Western Digital Technologies, Inc., San Jose, CA (US)

(72) Inventor: Adam Roberts, Moncure, NC (US)

(73) Assignee: Western Digital Technologies, Inc., San Jose, CA (US)

( * ) Notice: Subject to any disclaimer, the term of this patent is extended or adjusted under 35 U.S.C. 154(b) by 4 days.

(21) Appl. No.: 16/054,863

(22) Filed: Aug. 3, 2018

(65) Prior Publication Data

US 2020/0042208 A1 Feb. 6, 2020

(51) Int. Cl.
*G06F 3/06* (2006.01)

(52) U.S. Cl.
CPC .......... *G06F 3/0629* (2013.01); *G06F 3/0605* (2013.01); *G06F 3/067* (2013.01); *G06F 3/0649* (2013.01); *G06F 3/0653* (2013.01); *G06F 3/0659* (2013.01); *G06F 3/0689* (2013.01)

(58) Field of Classification Search
CPC .... G06F 3/0631; G06F 3/0653; G06F 3/0644; G06F 3/0629; G06F 2212/502; G06F 3/0643; G06F 3/067; G06F 11/3006; G06F 3/0685; G06F 11/30; G06F 11/3452; G06F 3/061; G06F 3/0649; G06F 3/065
See application file for complete search history.

(56) References Cited

U.S. PATENT DOCUMENTS

| | | | |
|---|---|---|---|
| 8,055,622 B1 | 11/2011 | Botes et al. | |
| 8,838,931 B1 | 9/2014 | Marshak et al. | |
| 8,880,801 B1 * | 11/2014 | Robins | G06F 11/1092 711/114 |
| 8,935,493 B1 * | 1/2015 | Dolan | G06F 3/0649 711/161 |
| 8,972,694 B1 * | 3/2015 | Dolan | G06F 3/0685 711/172 |
| 10,229,127 B1 | 3/2019 | Shang et al. | |
| 2007/0233868 A1 | 10/2007 | Tyrrell et al. | |
| 2011/0072225 A1 * | 3/2011 | Kawaguchi | G06F 3/0605 711/162 |
| 2012/0047346 A1 * | 2/2012 | Kawaguchi | G06F 12/0223 711/165 |
| 2013/0111129 A1 | 5/2013 | Maki et al. | |
| 2014/0149663 A1 * | 5/2014 | Golander | G06F 3/0685 711/114 |
| 2015/0067295 A1 * | 3/2015 | Storm | G06F 3/067 711/171 |

(Continued)

*Primary Examiner* — Ryan Bertram
(74) *Attorney, Agent, or Firm* — Patent Law Works LLP

(57) ABSTRACT

Example tiered storage systems, storage devices, and methods provide tier configuration by peer storage devices. Each tiered storage device is configured to communicate with a plurality of peer storage devices with storage device identifiers. The storage devices may query each other for performance characteristics and/or self-assigned performance tiers and organize the storage devices into a tier configuration. Each storage device, a storage controller, another system, and/or some combination may store metadata that describes the tier configuration. The tier configuration may then be used to route host data commands among the plurality of peer storage devices.

20 Claims, 6 Drawing Sheets

(56) References Cited

U.S. PATENT DOCUMENTS

| | | | | |
|---|---|---|---|---|
| 2015/0177999 A1* | 6/2015 | Gakhal | ............... | G06F 3/0608 |
| | | | | 709/213 |
| 2016/0077886 A1* | 3/2016 | Kramer | ............... | G06F 3/061 |
| | | | | 718/105 |
| 2018/0081816 A1* | 3/2018 | Coburn | ............... | G06F 12/1027 |
| 2018/0165189 A1 | 6/2018 | Tai et al. | | |
| 2018/0284976 A1* | 10/2018 | Kakaraparthi | ......... | G06Q 30/02 |
| 2019/0026048 A1* | 1/2019 | Muehge | ............... | G06F 16/335 |
| 2019/0171365 A1* | 6/2019 | Power | ............... | G06F 3/0649 |

* cited by examiner

TIERED STORAGE SYSTEM WITH TIER CONFIGURATION BY PEER STORAGE DEVICES

TECHNICAL FIELD

The present disclosure generally relates to data storage systems, and in a more particular example, to tiered data storage systems.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ automated tiered storage. Automated tiered storage provides different types of interconnected storage devices, grouped into tiers of similar devices, and algorithms for automatically moving data from one tier to another. Types of storage may include differences in storage media, storage device specifications, device reliability, cost per capacity, input/output (I/O) performance class, and RAID configurations. For example, a storage area network (SAN) may be configured using automated tiered storage that migrates data blocks or objects between RAID 10, RAID 5, and RAID 0 tiers or a solid-state drive (SSD) tier, an enterprise-class hard disk drive (HDD) tier, and a desktop-class HDD tier.

In some tiered storage systems, particularly those based on SSDs, device endurance and fatigue from heavy I/O use and/or media wear/failure, may cause the tier classification of storage devices to change over time. Similarly, changes in use, age, risk, and other factors may cause the tier classification of data elements to change over time. Therefore, individual data elements may migrate between and among tiers and individual storage devices to reflect changes in both storage device tier classifications and data element tier classifications during operation of some tiered storage systems.

Requiring a host or storage controller to configure, monitor, and manage storage device tier configurations and/or related communication and data transfers among peer storage devices in a multi-device tiered storage system may create unnecessary overhead, transfer inefficiency, and processor and memory requirements for the controllers that do not scale well with the number of drives.

Therefore, there still exists a need for disaggregated storage architectures that distribute memory and compute resources across storage devices, such as SSDs, and enable reliable data management services in the face of changing configurations and increasing scale of storage systems.

SUMMARY

Various aspects for tiered storage on peer storage devices, particularly, tier configuration management among peer storage devices are described. In an innovative aspect, a storage device comprises a processor, a memory, and an interface configured to communicate with a plurality of peer storage devices. A peer device registry is stored in the memory for identifying the plurality of peer storage devices. A tier manager is stored in the memory and executable by the processor to perform operations comprising querying the plurality of peer storage devices for at least one performance characteristic and organizing the plurality of peer storage devices into a tier configuration that assigns each of the plurality of peer storage devices to an assigned performance tier selected from a plurality of performance tiers. The assigned performance tier for each of the plurality of peer storage devices is selected using the at least one performance characteristic and at least one tiering criterion based on the at least one performance characteristic. A data command handler is stored in the memory and executable be the processor for receiving host data commands based on the tier configuration.

In various embodiments, the plurality of performance tiers includes a first performance tier and a second performance tier. The tier configuration may assign a first set of the plurality of peer storage devices to the first performance tier based on the at least one performance characteristic meeting the at least one tiering criterion and a second set of the plurality of peer storage devices to the second performance tier based on the at least one performance characteristic not meeting the at least one tiering criterion. The at least one performance characteristic may be selected from a storage capacity, a performance class, an endurance metric, or an overall health metric. A configuration publisher may be configured to send the tier configuration to a storage controller configured to route host data commands to the plurality of peer storage devices based on the tier configuration.

In some embodiments, the tier manager is further executable for repeatedly querying the plurality of peer storage devices for at least one performance characteristic and repeatedly organizing the plurality of peer storage devices into a plurality of tier configurations. Each of the plurality of tier configurations assigns each of the plurality of peer storage devices to assigned performance tiers selected from the plurality of performance tiers. The data command handler may be further configured to receive host data commands based on each of the plurality of tier configurations for a sequential period of operation. The tier manager may be configured to receive a change in the at least one tiering criterion and organize the plurality of peer storage devices into a revised tier configuration among the plurality of tier configurations in response to the change in the at least one tiering criterion. The at least one performance characteristic may change over time for the plurality of peer storage devices and the tier manager may initiate organizing the plurality of peer storage devices into at least one of the plurality of tier configurations in response to at least one of a reconfiguration request, a reconfiguration schedule, or a reconfiguration event.

In some embodiments, the storage device further comprises at least one storage media and a performance monitor configured to monitor the at least one performance characteristic for the at least one storage media. The at least one performance characteristic for the at least one storage media is used for generating the tier configuration. A self-tiering module may be configured to use the performance monitor and the at least one tiering criterion for assigning a self-assigned performance tier. A peer communication module may be configured to communicate the self-assigned performance tier to the plurality of peer storage devices through the interface.

In another innovative aspect, a computer-implemented method for execution by a storage device provides tier configuration services for peer storage devices. Storage device identifiers are stored for a plurality of peer storage devices in a first storage device. The plurality of peer storage devices are queried for at least one performance characteristic. The query is generated by the first storage device. The plurality of peer storage devices are organized into a tier configuration that includes a plurality of performance tiers. Organizing the tier configuration includes assigning each of the plurality of peer storage devices to one of the plurality of performance tiers using the at least one performance characteristic and at least one tiering criterion based on the at least one performance characteristic. Host data commands that are routed to the plurality of peer storage devices based on the tier configuration are received.

In various embodiments, the plurality of performance tiers includes a first performance tier and a second performance tier. The tier configuration assigns a first set of the plurality of peer storage devices to the first performance tier based on the at least one performance characteristic meeting the at least one tiering criterion and assigns a second set of the plurality of peer storage devices to the second performance tier based on the at least one performance characteristic not meeting the at least one tiering criterion.

The at least one performance characteristic is selected from a storage capacity, a performance class, an endurance metric, or an overall health metric. The tier configuration is sent to a storage controller configured to route host data commands to the plurality of peer storage devices based on the tier configuration.

In some embodiments, the plurality of peer storage devices may be repeatedly queried for at least one performance characteristic and the plurality of peer storage devices may be repeatedly organized into a plurality of tier configurations that assign each of the plurality of peer storage devices to assigned performance tiers selected from the plurality of performance tiers. Host data commands to the plurality of peer storage devices may be received based on each of the plurality of tier configurations for a sequential period of operation. A change in the at least one tiering criterion may be received and the plurality of peer storage devices may be organized into a revised tier configuration among the plurality of tier configurations in response to the change in the at least one tiering criterion. The at least one performance characteristic may change over time for the plurality of peer storage devices and at least one of the repeatedly organizing the plurality of peer storage devices may be initiated in response to at least one of receiving a reconfiguration request, processing a reconfiguration schedule, or detecting a reconfiguration event.

In some embodiments, the at least one performance characteristic is monitored for the first storage device and the first storage device is assigned to one of the plurality of performance tiers using the at least one performance characteristic and at least one tiering criterion based on the at least one performance characteristic. The assigned performance tier for the first storage device may be communicated to the plurality of peer storage devices and the tier configuration may be stored in each of the plurality of peer storage devices. The tier configuration includes the assigned performance tier for the first storage device.

In yet another innovative aspect, a storage system provides tier configuration services using plurality of peer storage devices. Each of the plurality of peer storage devices comprises at least one storage media. Means are provided for monitoring at least one performance characteristic for the at least one storage media. Means are provided for storing storage device identifiers for the plurality of peer storage devices. Means are provided for receiving a plurality of tiering criteria for a plurality of performance tiers. Means are provided for self-assigning a performance tier using the at least one performance characteristic and at least one tiering criterion from the plurality of tiering criteria. The at least one criterion is based on the at least one performance characteristic. Means are provided for communicating the self-assigned performance tier to the plurality of peer storage devices. Means are provided for routing host data commands to the plurality of peer storage devices based on the self-assigned performance tier for each of the plurality of peer storage devices.

In some embodiments, means are provided for generating a tier configuration based on the self-assigned performance tier from each of the plurality of peer storage devices, wherein the tier configuration is used by a storage controller for routing host data commands.

The various embodiments advantageously apply the teachings of multi-device tiered storage systems to improve the functionality of such computer systems. The various embodiments include operations to overcome or at least reduce the issues in the previous storage systems discussed above and, accordingly, are more efficient and scalable than other computer data storage architectures for some applications. That is, the various embodiments disclosed herein include hardware and/or software with functionality to improve the efficiency and scalability of tiered data management operations, based on managing storage tier configurations across a plurality of peer storage devices. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
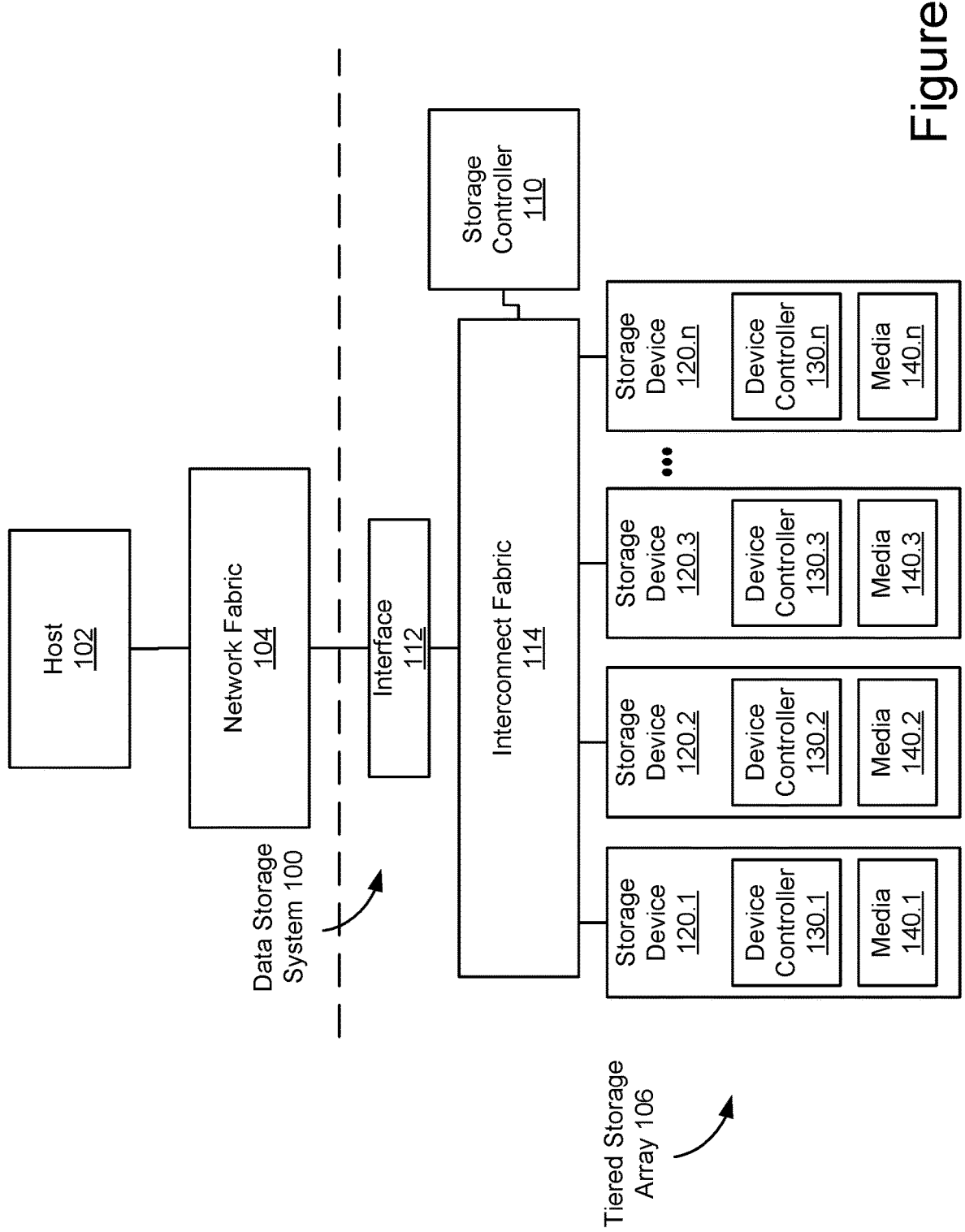
FIG. 1 schematically illustrates an example of a tiered storage system.

FIG. 1 shows an embodiment of an example tiered data storage system 100. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices).

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
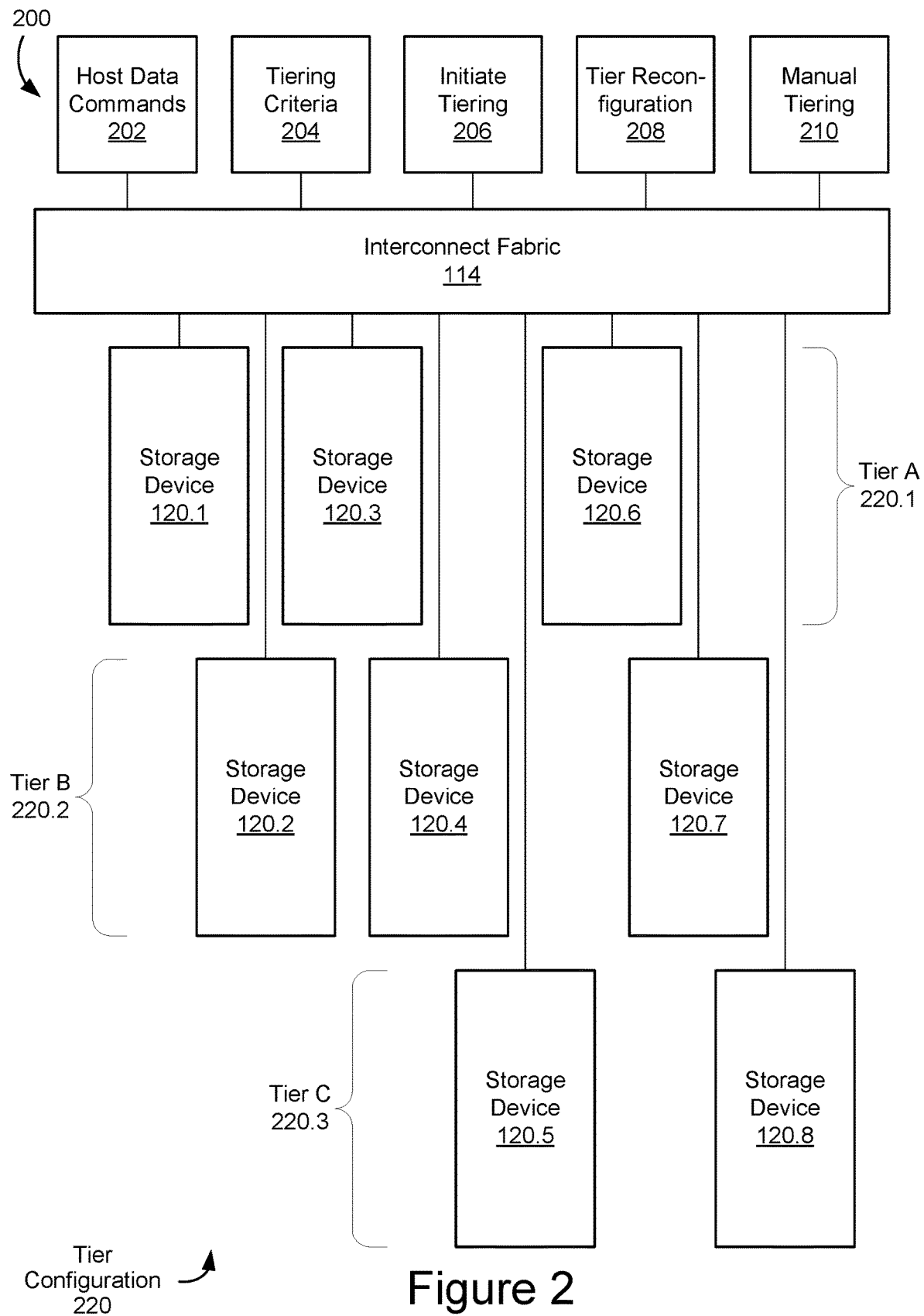
FIG. 2 schematically illustrates an example tier configuration and command modules for the tiered storage system of FIG. 1.

FIG. 2 is a block diagram illustrating an an example tier configuration 220 and command modules 200 for the data storage system 100, in accordance with some embodiments, as shown in FIG. 1. In the example shown, eight storage devices 120.1-120.8 are configured in three storage tiers 220.1-220.3. Each of storage devices 120.1-120.8 may communicate with the other storage devices through interconnect fabric 114. In some embodiments, interconnect fabric 114 may provide a peer communication channel among storage devices 120.1-120.8 regardless of which tier each storage device belongs to.

Storage tier A 220.1 may include storage devices 120.1, 120.3, and 120.6. Storage tier B 220.2 may include storage devices 120.2, 120.4, and 120.7. Storage tier C 220.3 may include storage devices 120.5 and 120.8. Each storage tier and the storage devices they contain may be represented collectively as tier configuration 220. In some embodiments, storage tiers 220.1-220.3 may be performance tiers where each set of storage devices has a common range of one or more performance characteristics.

Each storage tier 220.1-220.3 may represent a set of storage devices of a specified type, where each storage device type has shared parameters used to define the type for each tier. For example, in some tier configurations, tiers may be defined by a combination of media type and performance type, such as enterprise-class SSD, enterprise-class HDD, and desktop-class HDD. In this example, however, the storage devices in each tier may be relatively static because they are based solely on product specifications of the different storage devices. More dynamic types may be defined around effective capacity, actual I/O performance, endurance/wear, and/or overall health (represented by error rates, bad blocks/devices, etc.) and may be appropriate for tiered storage systems with tiering within a device media type (such as SSDs) and/or among storage devices with similar product performance characteristics. In some embodiments, storage devices 120.1-120.8 may have the same product specifications and/or limited product variations, such as differing capacities, but other product specifications being the same or similar.

In FIG. 2, storage devices 120.1-120.8 are shown schematically with positions that align with their respective tiers. This may be for visual organization of the schematic only. In some embodiments, each of storage devices 120.1-120.8 may occupy a similar bay within a storage rack unit and be arranged physically based on interconnect availability and the physical organization of the storage system they are installed in. In some embodiments, the physical location of each of storage devices 120.1-120.8 may have no relationship to storage tiers 220.1-220.3. For example, storage devices 120.1-120.8 may be arranged sequentially in adjacent bays from 120.1-120.8, even though storage device 120.2 is not in the same tier as the adjacent storage device 120.1 and storage device 120.3. In some embodiments, storage devices 120.1-120.8 may initially be positioned according to their tiers, but their tier assignment may change over time, while their physical position does not.

Storage devices 120.1-120.8 are configured to receive host data commands 202, such as host read operations, host write operations, host copy operations, host erase operations, and data management operations. Storage devices 120.1-120.8 may execute those operations, generally with regard to their respective storage media or other storage device resources (such as non-volatile cache, operating memory, processors, or other specialized hardware/software). In some embodiments, host data commands 202 may originate with host 102 and may be routed through storage controller 110. Storage tiers 220.1-220.3 may be used to route host data commands 202 to a storage device in the storage tier that matches the data storage criteria for a particular host data command. For example, there may be data write criteria associated with each of storage tiers 220.1-220.3 that are evaluated for each host data command 202. In some embodiments, each host data command 202 may include a session variable, metadata, or other storage tier indicator that correlates to the available storage tiers 220.1-220.3 and may be used for selecting a destination storage device for the host data command.

In some embodiments, configuration management commands may be received by storage devices 120.1-120.8. For example, tiering criteria command 204, initiate tiering command 206, tier reconfiguration command 208, and manual tiering command 210 may be received from host 102, storage controller 110, or another storage device. One or more of storage devices 120.1-120.8 may receive and process configuration management commands. For example, storage device 120.1 may be identified as a tier configuration leader and configuration management commands may be directed to storage device 120.1 for processing. In some embodiments, configuration management commands may be directed to any or all of storage devices 120.1-120.8 without a designated tier configuration lead.

Tiering criteria command 204 may provide tiering criteria parameters to storage devices 120.1-120.8. For example, tiering criteria command 204 may include a set of storage device tiering criteria for each tier of storage defined for tier configuration 220. In the example shown, tiering criteria command 204 may define three sets of tiering criteria parameters for storage tiers 220.1-220.3 respectively. For example, tier A 220.1 may be SSDs with at 50% or less of their endurance spent, tier B 220.2 may be SSDs with 51-80% of their endurance spent, and tier C 220.3 may be SSDs with greater than 80% of their endurance spent. In some embodiments, tiering criteria command 204 may be used to provide initial storage tiering criteria when tier configuration 220 is initiated using initiate tiering command 206. Tiering criteria command 204 may be used to update tiering criteria during the operating life of tiered storage array 106. For example, a complete set of tiering criteria parameters may be provides after the initial tier configuration or a subset of tiering criteria parameters to modify the prior set of tiering criteria parameters may be provided.

In some embodiments, tiering criteria command 204 may include data tiering criteria parameters. For example, each set of storage tiering criteria parameters may have a corresponding set of data tiering criteria parameters to determine what data elements should be stored in which of storage tiers 220.1-220.3. Storage devices 120.1-120.8 may store tiering criteria parameters in one or more data structures within storage devices 120.1-120.8 in response to receiving tiering criteria command 204. For example, storage devices 120.1-120.8 may include a device tiering criteria table and/or a data tiering criteria table. In some embodiments, the tiering criteria from tiering criteria command 204 may be stored in storage array metadata describing various configuration and parameter settings of tiered storage array 106 and replicated in each of storage devices 120.1-120.8.

Initiate tiering command 206 may be received by storage devices 120.1-120.8 to initiate a first tier configuration process to identify performance parameters for storage devices 120.1-120.8 and assign them to the appropriate storage tiers 220.1-220.3. For example, initiate tiering command 206 may cause at least one of storage devices 120.1-120.8 to send a performance query to the other storage devices to receive performance values corresponding to the tiering criteria parameters. These received performance values may enable the receiving storage device to organize storage devices 120.1-120.8 and assign them to appropriate storage tiers 220.1-220.3 by comparing the performance values to the tiering criteria parameters. In another example, initiate tiering command 206 may cause each of storage devices 120.1-120.8 to evaluate its own performance values against the tiering criteria parameters and self-identify the corresponding storage tier 220.1-220.3. Each of storage devices 120.1-120.8 may then publish their storage tier to the other storage devices and/or the system or subsystem that sent initiate tiering command 206.

Tier reconfiguration command 208 may be received by storage devices 120.1-120.8 to reevaluate the assignment of storage devices 120.1-120.8 to the storage tiers 220.1-220.3. For example, the performance values for storage devices 120.1-120.8 may change over time and/or updated storage tiering criteria may be received in a new tiering criteria command 204. In some embodiments, tier reconfiguration command 208 may initiate a process similar to initiate tiering command 206 and generate a new tier configuration. For example, tier reconfiguration command 208 may be initiated periodically over the life of tiered storage array 106 to generate a sequential series of tier configurations, each of which is used until the parameters and/or criteria for organizing the tiers change.

Manual tiering command 210 may be received by storage devices 120.1-120.8 to override or modify the tiering assignments made by storage devices 120.1-120.8. For example, tier configuration 220 may be generated by storage devices 120.1-120.8 in response to initiate tiering command 206, tier reconfiguration command 208, or other triggers and published back to host 102, storage controller 110, or another system. A storage system or an administrative user of the system may determine that one or more of storage devices 120.1-120.8 should be reassigned to another of storage tiers 220.1-220.3 in spite of the defined tiering criteria. Manual tiering command 210 may provide an updated storage tier assignment entry for one or more storage devices 120.1-120.8 or a complete tier configuration to override the tier configuration organized by storage devices 120.1-120.8.

Figure 3:
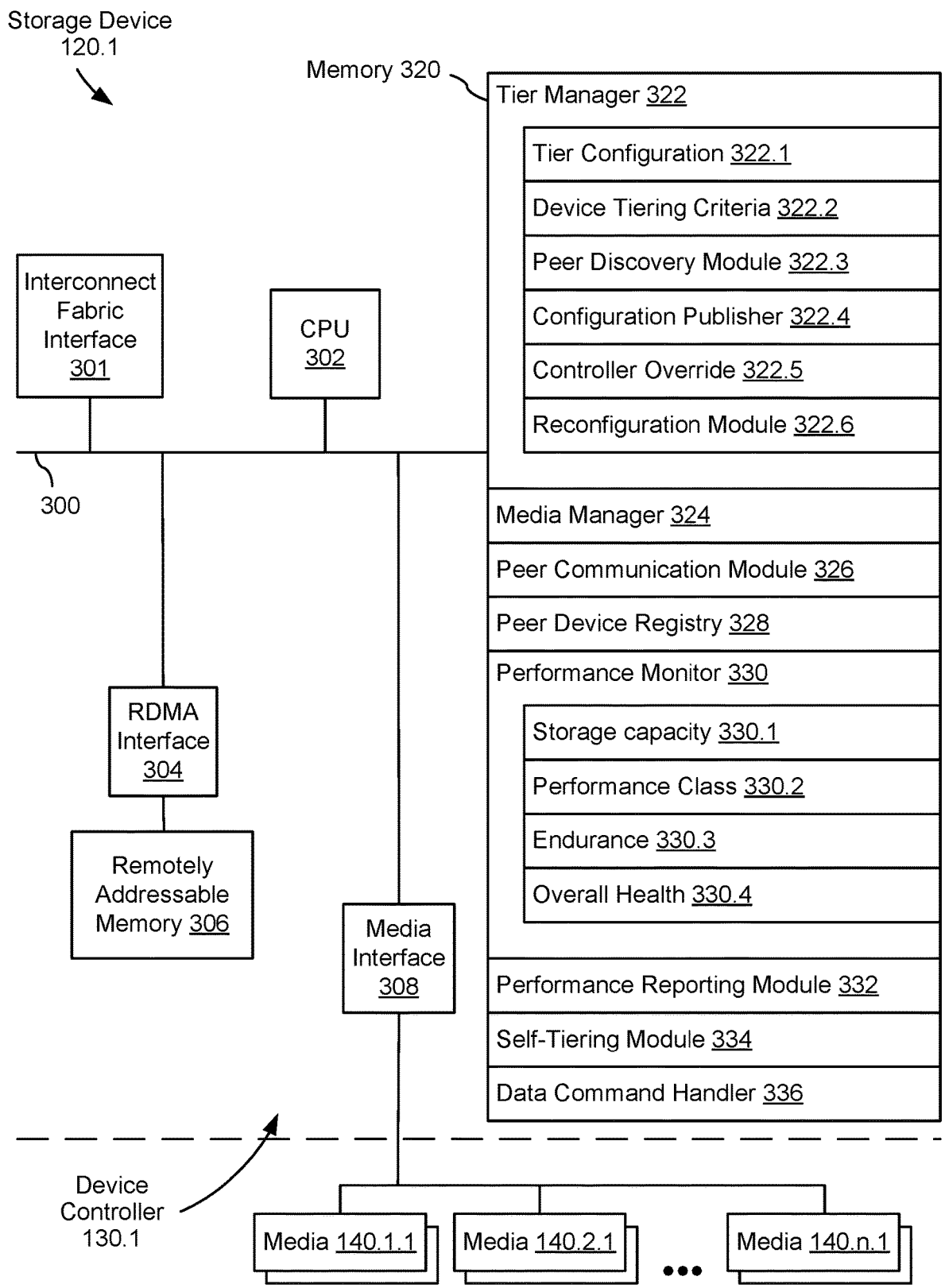
FIG. 3 schematically illustrates an example of a storage device of the tiered storage system of FIG. 1.

In some embodiments, as shown in FIG. 3, a storage device 120.1 includes the functions of a device controller 130.1 and tier manager 322 using common compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, remote direct memory access (RDMA) interface 304, media interface 308, and any number of additional modules, such as erasure coding engines, error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of NVM controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

Additional modules (not shown) supporting one or more functions of storage device 120 may be connected to CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its media devices 140.1.1-140.1.n, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating tier management handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

- tier manager 322 for organizing tier configurations in conjunction with peer storage devices and/or commands from other systems or subsystems, such as storage controller 110 or host 102
- media manager 324 for managing storage device FTL data (including logical address mapping) and related processes and requests, such as media read and write operations through media interface 308 to media devices 140.1.1-140.1.n;
- peer communication module 326 for communicating command messages and data transfers between storage devices 120 through interconnect fabric interface 301, sometimes using access to remotely addressable memory 306, without the intervention of host 102, storage controller 110, or similarly distinct control systems;
- peer device registry 328 for identifying the storage device identifiers of peer storage devices and/or storing other data management and/or hosted services information related to each other storage device;
- performance monitor 330 for calculating and/or tracking one or more performance values and/or performance-related events for measuring performance over time for storage device 120.1 and/or media devices 140;
- performance reporting module 332 for reporting performance values and/or performance-related events to other systems or components, such as peer storage devices;
- self-tiering module 334 for evaluating device tiering criteria and assigning storage device 120.1 to a matching storage tier; and
- data command handler 336 for receiving host data commands and/or host service requests from other systems or subsystems, such as host 102, storage controller 110, or peer storage devices.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

Tier manager 322 may provide an offloaded and/or distributed service to enable storage device 120.1 and its peer storage devices to organize tier configurations for tiered storage array 106. In some embodiments, tier manager 322 may generate and/or store tier configuration 322.1. For example, tier configuration 322.1 may be a data structure describing two or more storage tiers and which storage devices in tiered storage array 106 belong to which tier. One or more lists, tables, arrays, or other data structures may be used to associate a storage tier identifier with each corresponding storage device assigned to that tier. In some embodiments, storage tier identifiers may be stored in peer device registry 328 for each storage device to provide tier configuration 322.1.

In some embodiments, tier manager 322 may include storage device tiering criteria 322.2. For example, storage device tiering criteria 322.2 may include one or more performance indicators associated with storage devices 120, such as available storage capacity, performance class, endurance, overall health, age, error rate, etc. For each performance indicator, tiering criteria 322.2 may define a performance metric range or threshold for describing the performance characteristic and determining whether each storage device meets the performance characteristic. In some embodiments, tiering criteria 322.2 may be provided in a data structure, such as one or more lists, tables, arrays or other data structures.

In some embodiments, device tiering criteria 322.2 may be loaded into tier manager 322 during initial configuration of storage device 120.1 and/or tiered storage array 106, or during similar initialization or configuration events. In some embodiments, device tiering criteria 322.2 may be received in a data management command from a host, storage controller, or peer storage device. For example, an administrative user of host 102 may use a data management application to configure or modify device tiering criteria 322.2 for use going forward and send appropriate data management commands to storage device 120.1 and/or other systems or subsystems storing and using device tiering criteria 322.2.

In some embodiments, tier manager 322 in storage device 120.1 may act as a tier configuration lead storage device for a peer-to-peer tier configuration. For example, tier manager 322 may be configured or receive a data management command to generate a new storage tier configuration 322.1 based on storage device tiering criteria 322.2 and performance parameters of each storage device 120 in tiered storage array 106.

Peer discovery module 322.3 may be configured to receive updated or current performance parameter values for each storage device 120. For example, peer discovery module 322.3 may send a query to each other storage device 120 using peer communication module 326 and receive a response message including a storage device identifier and one or more performance parameter values. In some embodiments, peer discovery module 322.3 may receive one or more messages with performance parameter values without sending a query to initiate the message. For example, a data management command sent to each of storage devices 120 may trigger each storage device to send its performance parameter values to each other peer storage device or a lead storage device identified in the data management command.

In some embodiments, tier manager 322 may include a configuration publisher 322.4 for providing the current tier configuration 322.1 to other systems or sub-systems. For example, configuration publisher 322.4 may encode tier configuration 322.1 into a data management command or status message to one or more other systems, such as host 102, storage controller 110, and/or storage devices 120. In some embodiments, configuration publisher 322.4 may write tier configuration 322.1 to a data structure in a memory location accessible to the other systems, such as an identified memory location in remotely addressable memory 306. In some embodiments, configuration publisher 322.4 may provide tier configuration 322.1 on demand in response to queries or other data management commands from other systems.

In some embodiments, tier manager 322 may include a controller override 322.5 that may receive alternate tier configurations and/or specific updates to tier configuration 322.1 from another source, such as host 102 or storage controller 110. This may allow users with appropriate privileges to override tier configuration 322.1 or portions thereof with storage tier assignments that may violate storage device tiering criteria 322.2 and/or performance characteristic values. In some embodiments, these tier assignment modifications may be made in response to receiving tier configuration 322.1 after it is generated by tier manager 322 and published using configuration publisher 322.4.

In some embodiments, tier manager 322 may include a reconfiguration module 322.6 for initiating reconfiguration of tier configuration 322.1 from a current tier configuration to a new tier configuration based on changes in either device tiering criteria 322.2 and/or updated performance characteristic values for storage devices 120. For example, reconfiguration module 322.6 may enable tier manager 322 to repeatedly identify device tiering criteria 322.2, discover storage device performance characteristic values through peer discovery module 322.3, and organize storage devices 120 into new tier configurations 322.1 over the operating life of tiered storage array 106. Each time reconfiguration module 322.6 recalculates tier configuration 322.1, storage device 120.1, peer storage devices 120, and/or other systems (e.g. host 102, storage controller 110, etc.) may use the new tier configuration 322.1 for some operating period until a future reconfiguration (and/or controller override 322.5) changes tier configuration 322.1.

In some embodiments, tier manager 322 may receive a reconfiguration request to trigger reconfiguration module 322.6. For example, host 102, storage controller 110, and/or peer storage devices 120 may initiate a reconfiguration by sending tier manager 322 in storage device 120.1 a reconfiguration request or similar data management command. In some embodiments, tier manager 322 may use a reconfiguration schedule to periodically reconfigure tier configuration 322.1. For example, reconfiguration module 322.6 may include a time-based schedule for initiating reconfigurations, such as monthly, weekly, daily, or with greater frequency. In some embodiments, the reconfiguration schedule may be configured by a user and/or a system algorithm to select reconfiguration times where tiered storage array 106 has lower I/O usage and/or avoids other data management tasks. In some embodiments, tier manager 322 may detect a reconfiguration event that triggers reconfiguration module 322.6. For example, the replacement or rebuild of one or more of storage devices 120 may cause tier manager 322 to calculate a new tier configuration 322.1. Other triggering events may include other changes in configuration, including new device tiering criteria, RAID configuration changes, application-level changes to uses of storage system 100, etc.

In some embodiments, media manager 324 manages access to and maintenance of media devices 140. For example, media manager 324 may include base FTL services for storage device 120 and manages the storage device FTL map, as well as read, write, and data management access media devices 140. Host commands involving host data reads, writes, erases, etc. may be directed by media manager 324 through media interface 308 for accessing media devices 140. In some embodiments, host data commands may be pre-processed by data command handler 336 and related internal data access commands may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 324 may be responsible for bad block management, bad block spare overprovisioning, and allocation of gap free logical space throughout the life of the media devices 140. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140. In some embodiments, media manager 324 does not manage any RAID-related redundancy or striping across the NVM under its management and RAID groups and striping may be managed across the storage devices in a distributed fashion.

In some embodiments, peer communication module 326 may provide communication among storage devices 120 using interconnect fabric 114 without being routed through storage controller 110 or another host or controller component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114.

In some embodiments, peer communication module 326 operates in conjunction with RDMA interface 304 to manage local and remote use of remotely addressable memory 306. For example, local operations by media manager 324 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 328 may be a data structure for maintaining information regarding each other peer storage device in a peer group, such as storage devices 120 in tiered storage array 106. For example, peer device registry 328 may be a table, list, array, database, or similar data structure for storing storage device identifiers, other addressing information, and/or additional information on peer storage devices, such as specifications and/or parameters of the storage devices. In some embodiments, peer device registry 328 may include storage tier identifiers for each storage devices corresponding to tier configuration 322.1. For example, each storage device may have an entry (e.g. a row in a table) with a key (e.g. storage device identifier) and a field (e.g. column in a table) for a storage tier identifier (e.g. numeric value 1-n corresponding to storage tier assignment). In some embodiments, peer device registry 328 may be stored in storage array metadata repeated in each storage device in tiered storage array 106.

In some embodiments, storage device 120.1 may include a performance monitor 330 that monitors one or more performance characteristics that may change over the operating life of storage device 120.1. For example, performance monitor 330 may monitor changes in total and/or available storage capacity 330.1, I/O performance class 330.2, media device endurance 330.3, and/or overall health 330.4.

Storage capacity 330.1 may include one or more metrics describing the current memory capacity of media devices 140, generally in terms of bytes measured at an appropriate order of magnitude (e.g. MB, GB, TB, PB). Storage capacity 330.1 may change over time as bad blocks, cells, and/or devices are identified over time.

Performance class 330.2 may include one or more metrics for data read/write operations, such as read time, write time, move time, sequential or random series measurements, and aggregated calculations of bandwidth or I/O operations per second (TOPS), including peaks and/or averages. Performance class 330.1 may change over time as channels, processors, and media devices age, potentially requiring greater error correction, retries, voltage threshold changes, and background GC and/or data management functions. Performance class 330.1 may include an aggregate or clustered performance rating relative to its peer storage devices or other storage device standards.

Endurance 330.3 may include one or more metrics for measuring read/write failures based on NVM wear. Endurance may be based on predicted reliability for a particular storage device (in terms of write capacity) and the number of lifetime writes that have been made to the storage device. In some embodiments, other indicators, such as error rates, allocation of reserved blocks, and/or internal media management metrics used for wear balancing, GC, read/write parameters, etc. may be used to calculate endurance. Endurance 330.3 may include a percentage of the predicted life of the storage device that has been used, such as 10% for a relatively new drive, 50% for the midpoint of the drives predicted life, or 90% for a drive approaching end of life.

Overall health 330.4 may include any number of aggregate metrics for predicting the capacity, performance, endurance, and other factors, as well as their interactions that may determine the risk of continued use of storage device 120.1. Measuring the overall health of storage media and storage device operation may include multivariable, weighted analysis of various performance characteristics and related metrics or may be associated with a single metric identified as an effective surrogate for overall storage device health. For example, allocation of reserved blocks in absolute terms or as a rate, may be used as an overall health metric that represents a combination of capacity, performance, and endurance implications.

In some embodiments, performance reporting module 332 may enable storage device 120.1 to make one or more performance characteristic values monitored by performance monitor 330 available to other systems. For example, performance monitor 330 may place reported values in a data structure and performance reporting module 332 may use the values in the data structure to respond to queries from other systems, such as peer storage devices, storage controller 110, and/or host 102. In some embodiments, peer storage devices may send performance queries via peer communication messages to storage device 120.1 requesting performance characteristic values and performance reporting module 332 may respond with the requested values. In some embodiments, performance reporting module 332 may log performance characteristic values in a memory location accessible to other systems, such as remotely addressable memory 306.

In some embodiments, storage device 120.1 and other peer storage devices 120 may include self-tiering module 334 for self-assigning their storage tier based on device tiering criteria 322.2 and one or more performance characteristic values from performance monitor 330. For example, self-tiering module 334 may calculate and assign a storage tier for storage device 120.1 and make the self-tiering assignment available for organizing tier configuration 322.1 using tier manager 322. In some embodiments, each storage device 120 may assign its own storage tier using self-tiering module 334 and then broadcast that assignment to the other storage devices for organizing tier configuration 322.1.

In some embodiments, storage device 120.1 may include data command handler 336 for receiving data commands and other messages from other storage devices and systems. Data command handler 336 may include an addressable communication channel for receiving messages from other systems or subsystems, such as hosts, storage controllers, and peer storage devices (e.g., host 102, storage controller 110, or storage devices 120). In some embodiments, data command handler 336 may receive data management commands or requests that can be executed by the memory and compute resources of storage device 120.1, alone or in conjunction with peer storage devices and/or storage controller 110. For example, data command handler 336 may receive host service requests for offloaded and/or distributed services, in addition to storage device read/write or data management commands. Data command handler 336 may parse the received requests and initiate, continue, modify, or stop hosted services and/or local read/write or data management operations. In some embodiments, data command handler 336 may initiate read, write, and parity operations based on corresponding requests, which may or may not utilize one or more hosted services.

In some embodiments, data command handler 336 may receive tiering criteria commands (e.g. tiering criteria command 204), initiate tiering commands (e.g. initiate tiering command 206), tier reconfiguration commands (e.g. tier reconfiguration command 208), and/or manual tiering commands (e.g. manual tiering command 210). Data command handler 336 may parse the received tier management commands and direct them to tier manager 322 or another component for further processing. In some embodiments, data command handler 336 may receive and direct peer storage device messages. For example, a peer request for performance characteristic values may be received and directed to performance reporting module 332.

Figure 4:
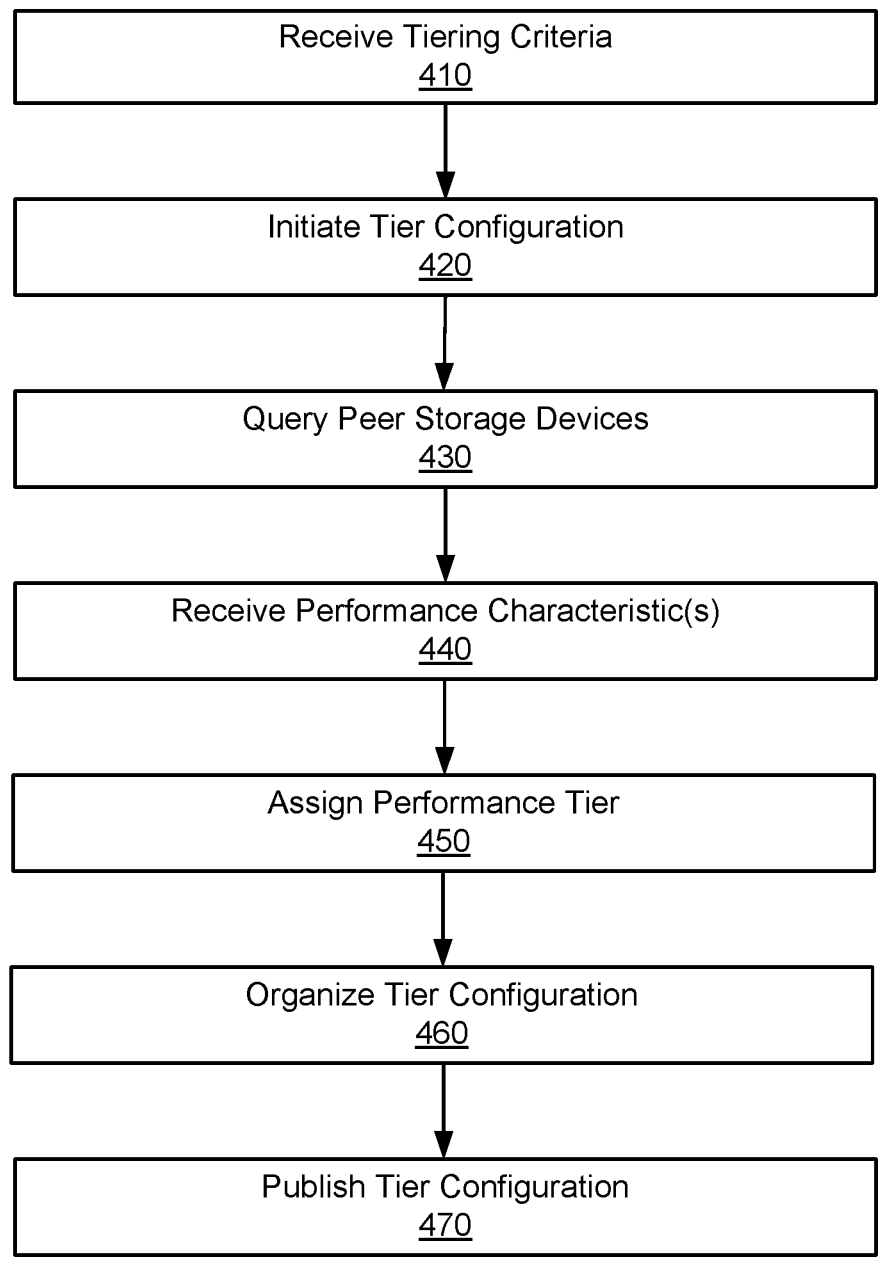
FIG. 4 illustrates an example of a method for configuring a storage tier configuration using a storage device.

As shown in FIG. 4, storage device 120.1 operating within data storage system 100 may be operated according to a tiered storage tier configuration service for organizing a tier configuration of data storage devices 120. For example, storage device 120.1 may respond to one or more service requests from a storage controller (e.g. storage controller 110), a host (e.g. host 102), and/or one or more peer storage devices (e.g. storage devices 120) to organize a tier configuration according to the method 400 illustrated by blocks 410-470 of FIG. 4. Method 400 may include use of performance criteria from peer storage devices to calculate and assign storage tiers.

At block 410, tiering criteria may be received by a storage device. For example, when a host, server, peer storage device, or other network system using the data storage system needs to initiate or reconfigure a tiered storage array, tiering criteria may need to be available for use in assigning individual storage devices to appropriately defined storage tiers. In some embodiments, tiering criteria may be defined for the tiered storage array during an initiate setup or configuration of storage system 100 and/or one or more storage devices 120 and the tiering criteria may be stored in a data structure within or accessible to storage devices 120. In some embodiments, tiering criteria may be provided to storage devices 120 initially, periodically, or on demand through a tiering criteria command that includes complete or updated storage device tiering criteria information.

At block 420, a tier configuration is initiated to organize a new tier configuration for use in routing data commands among the storage tiers. For example, a storage device may receive an initiate tiering command, a tier reconfiguration command, or otherwise trigger a reconfiguration. In some embodiments, only a single storage device may receive a command or request to initiate a tier configuration and that storage device will be the tier configuration lead device for organizing the requested tier configuration.

At block 430, a storage device initiating the tier configuration may query the other peer storage devices for information to use in assigning storage tiers to each of the peer storage devices. For example, a request for one or more performance characteristic values may be sent to each other peer storage device. In some embodiments, the query may be sent to the peer storage devices via a peer communication channel that includes drive-to-drive messaging and/or data access via remotely addressable memory locations.

At block 440, one or more performance characteristics may be received in response to the query at block 430. For example, each storage device may send one or more performance characteristic values back to the querying storage device. In some embodiments, one or more performance characteristics may have been previously provided and the response to the query may include only updates to such values that have changed from previously provided information. In some embodiments, peer storage devices may not require a query (and may skip block 430) and may send, broadcast, or log performance characteristic values and changes as needed or in response to another event or message.

At block 450, a performance tier may be assigned to each storage device based on the storage device tiering criteria and the performance characteristics. For example, the storage device tiering criteria may be based on various ranges of endurance metrics, such as percentage of lifetime writes used, each storage device provides its endurance value, and whichever range the endurance value falls in is the assigned storage tier. So, with storage device tiering criteria that defines under 50% lifetime writes used as tier 1, 51-80% lifetime writes used as tier 2, and over 80% lifetime writes used as tier 3, a storage device reporting a lifetime writes percentage of 73% would be assigned to storage tier 2.

At block 460, a tier configuration may be organized based on assigning a storage tier to every storage device such that each storage tier corresponds to a set of storage devices with the corresponding performance characteristic(s). For example, in a tiered storage array containing 8 storage devices, three may be assigned to tier 1, three may be assigned to tier 2, and two may be assigned to tier 3.

At block 470, the tier configuration may be published for use in routing or otherwise allocating host data commands, such as host write commands, to storage devices assigned to the appropriate storage tier for the host data command. For example, a host data command may include metadata, a session variable, or connection that indicates the related data units as belonging to tier 1, tier 2, or tier 3 based on tiering criteria. A host, storage controller, or other system responsible for routing host data commands may read or calculate the storage tier for the host data command and select a storage device assigned to the matching storage tier to receive the host data command. In some embodiments, the tier configuration may be published through a message to one or more other systems containing a data structure describing the complete tier configuration and/or updates to a prior tier configuration. For example, a tier configuration may be provided to a requesting system as a status message in response to an initiate tiering or tier reconfiguration command. In some embodiments, a tier configuration may be published by writing it to a known memory location, such as in a remotely addressable memory.

Figure 5:
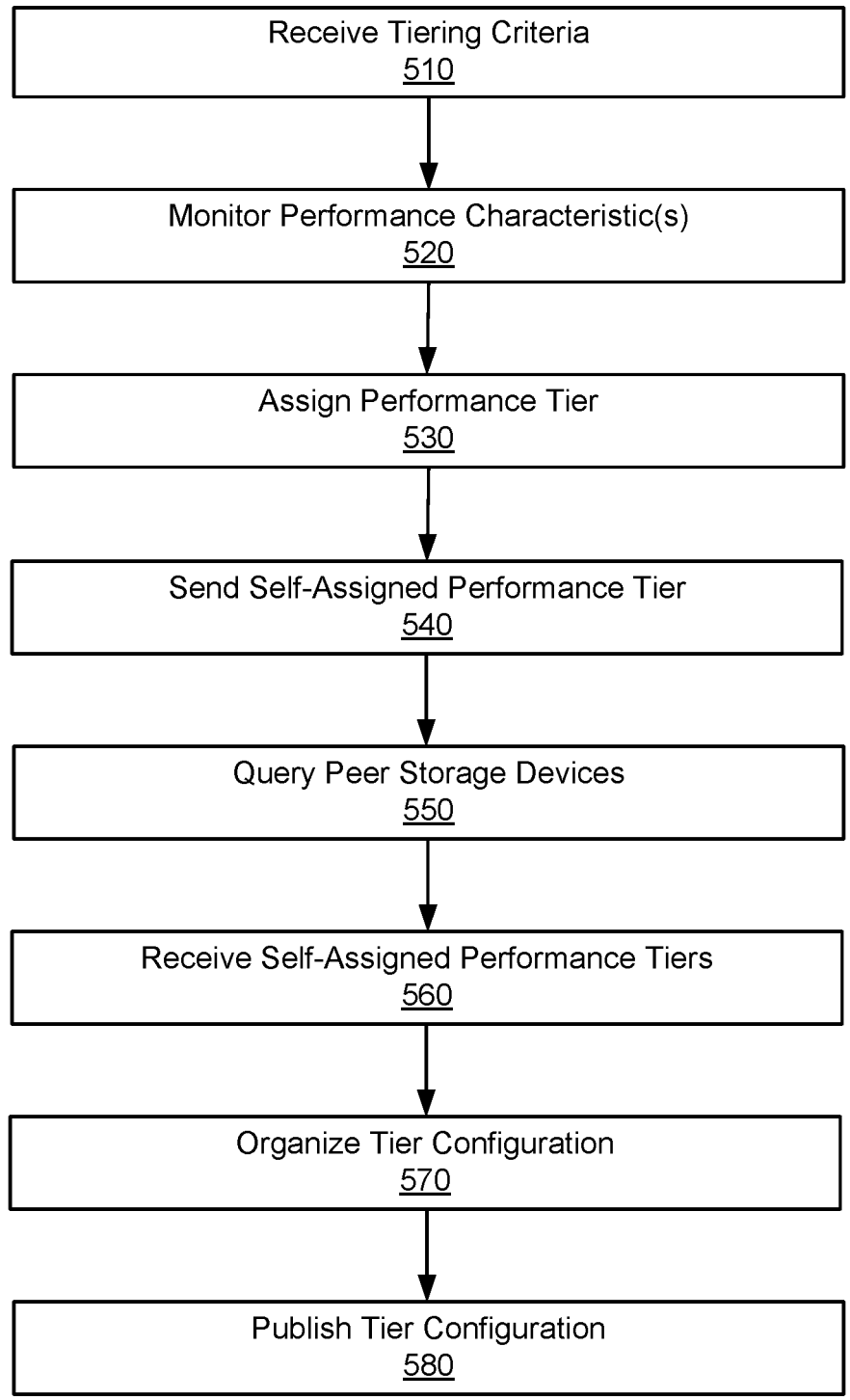
FIG. 5 illustrates another example of a method for configuring a storage tier configuration using a storage device.

As shown in FIG. 5, storage device 120.1 operating within data storage system 100 may be operated according to a tiered storage tier configuration service for organizing a tier configuration of data storage devices 120. For example, storage device 120.1 may respond to one or more service requests from a storage controller (e.g. storage controller 110), a host (e.g. host 102), and/or one or more peer storage devices (e.g. storage devices 120) to organize a tier configuration according to the method 500 illustrated by blocks 510-580 of FIG. 5. Method 500 may include use of self-assigned storage tiers from peer storage devices to organize the tier configuration. In some embodiments, the use of peer performance characteristics or self-assignment may be a selectable or configurable setting for a storage system, tiered storage array, and/or storage device. In some embodiments, a combination of processes may be used, such as when not all storage devices are capable of self-assignment.

At block 510, tiering criteria may be received by a storage device. For example, receiving storage device tiering criteria may operate similarly to block 410 described above with regard to FIG. 4. In some embodiments, the tiering criteria may determine which performance characteristics and related values may be relevant to determining storage device performance tiers for a tier configuration. In some embodiments, tiering criteria may include clustering or benchmarking against performance values of peer storage devices. For example, a storage device may still query peer storage devices for performance characteristic values to use in its own self-assignment process.

At block 520, one or more performance characteristics that are relevant to the tiering criteria are monitored. For example, a storage device may include a performance monitor or other modules that monitor performance characteristics of the storage device for use in tiering or other data management processes. These performance characteristics may be captured, calculated, and/or stored in one or more data structures or on-demand as needed for data management processes. In some embodiments, the performance characteristic values generated by a performance monitor or other storage device resource may not directly match the performance characteristic metric in the tiering criteria and additional calculation or conversion may be necessary for comparison against the tiering criteria.

At block 530, the storage device may assign a storage device tier to itself based on the monitored performance characteristic or characteristics. For example, assigning the storage device tier may operate similarly to block 450 in FIG. 4. In some embodiments, the device tiering criteria may be based on multiple criteria and/or calculations for determining the storage device tier and the storage device may use an iterative process for accessing monitored performance characteristics and calculating its tier assignment. For example, because the storage device may have access to more performance information about its own operations than it might typically receive from peer devices, it may follow a more complex tiering algorithm for self-assigning its performance tier.

At block 540, the storage device may optionally send or otherwise publish its self-assigned performance tier. For example, the storage device may send a message to a storage controller, host, and/or peer storage devices and any of those systems may use the self-assigned performance tier to organize a tier configuration. In some embodiments, the self-assigned performance tier may be sent to a requesting system or a tier configuration lead storage device that may have initiated the current tiering process. Sending or publishing the self-assigned performance tier may not be used in instances when the storage device itself is responsible for organizing and publishing the complete (or updated) tier configuration.

At block 550, a storage device organizing a tier configuration for its own use or for publication may query the other peer storage devices for their self-assigned storage tiers. For example, a request for one or more performance characteristic values may be sent to each other peer storage device. In some embodiments, the query may be sent to the peer storage devices via a peer communication channel that includes drive-to-drive messaging and/or data access via remotely addressable memory locations.

At block 560, self-assigned performance tiers may be received in response to the query at block 550. For example, each storage device may send its self-assigned performance tier back to the querying storage device. In some embodiments, the performance tier may have been previously provided and the response to the query may include only updates to performance tiers that have changed from previously provided information. In some embodiments, peer storage devices may not require a query (and may skip block 550) and may send, broadcast, or log self-assigned performance tiers and changes as needed or in response to another event or message, similar to a storage device performing method 500 at block 540.

At block 570, a tier configuration may be organized based on assigning a storage tier to every storage device such that each storage tier corresponds to a set of storage devices with the corresponding performance characteristic(s). For example, in a tiered storage array containing 8 storage devices, three may be assigned to tier 1, three may be assigned to tier 2, and two may be assigned to tier 3. In some embodiments, a lead storage device may organize the storage configuration based on self-assigned performance tiers for each storage device, including itself.

At block 580, the tier configuration may be published for use in routing or otherwise allocating host data commands, such as host write commands, to storage devices assigned to the appropriate storage tier for the host data command. For example, publishing the tier configuration may be similar to block 470 in FIG. 4, described above.

Figure 6:
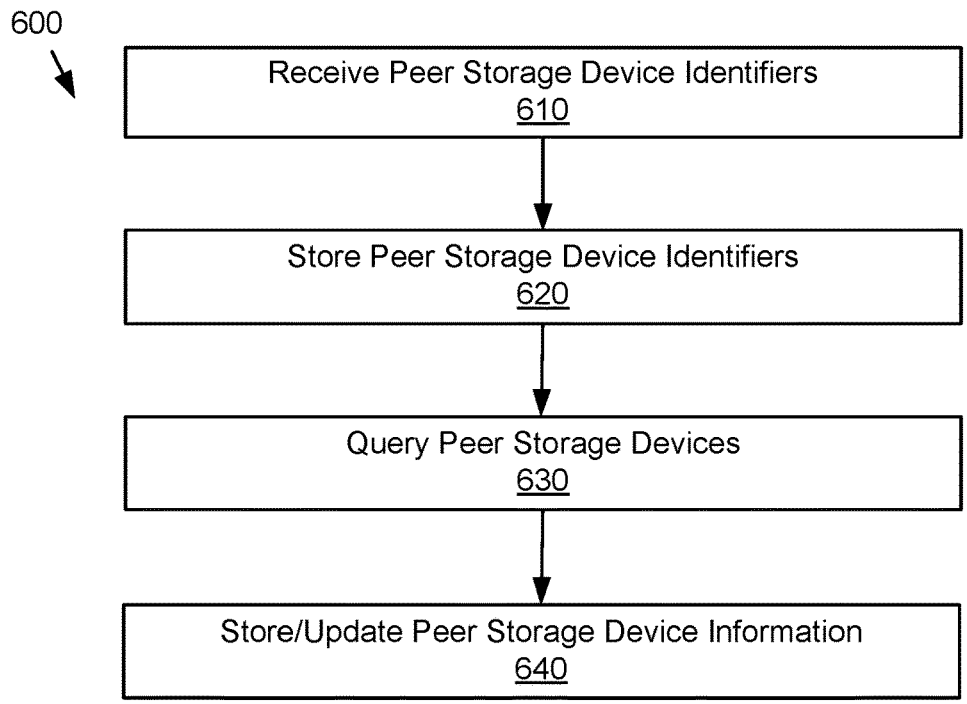
FIG. 6 illustrates an example of a method for managing peer storage device information in a storage device.

As shown in FIG. 6, storage device 120.1 operating within data storage system 100 may be operated according to a peer information service for receiving information from other data storage devices 120, such as performance characteristic data or self-assigned tier data. For example, storage device 120.1 may respond to one or more service requests from a storage controller (e.g. storage controller 110), a host (e.g. host 102), and/or one or more peer storage devices (e.g. storage devices 120) to provide storage device information according to the method 600 illustrated by blocks 610-640 of FIG. 6.

At block 610, peer storage device identifiers are received by a storage device. For example, each storage device 120 may receive peer storage identifiers for each other storage device in tiered storage array 106. These storage device identifiers may include sufficient information to route messages to and receive messages from peer storage devices using one or more network communication protocols supported by interconnect fabric 114. In some embodiments, the peer storage identifiers are received when the storage array and/or individual storage devices are configured and/or reconfigured. Peer storage identifiers may also be received to update changes in the set of peer storage devices over the life of the storage array or any defined peer group.

At block 620, peer storage device identifiers are stored in the storage device for future use in peer drive communication and/or data management. For example, each storage device 120 may include a peer device registry that contains the peer storage device identifiers and other information relevant to the configuration of, management of, and/or communication with the peer storage devices.

At block 630, one or more peer storage devices may be queried for desired storage device information. For example, desired storage device information may include one or more performance characteristic values and/or self-assigned performance tier information. Queries for other types of information to support tier configuration or other array configuration and/or data management tasks may also be possible. In some embodiments, the query may take the form of a peer communication message directed through packetized network communication. In some embodiments, the query may take the form of a data read from a remotely accessible memory location containing the desired data. For example, each storage device may maintain a performance log and/or performance tier designation in its remotely addressable memory.

At block 640, the desired storage information from a peer storage device may be received and stored or updated. For example, performance characteristic values and/or self-assigned performance tiers may be received in response to the query at block 630. In some embodiments, the received information may be used for further calculations, such as organization of a tier configuration. In some embodiments, the received information may be added to the peer device registry for future retrieval and use.

Figure 7:
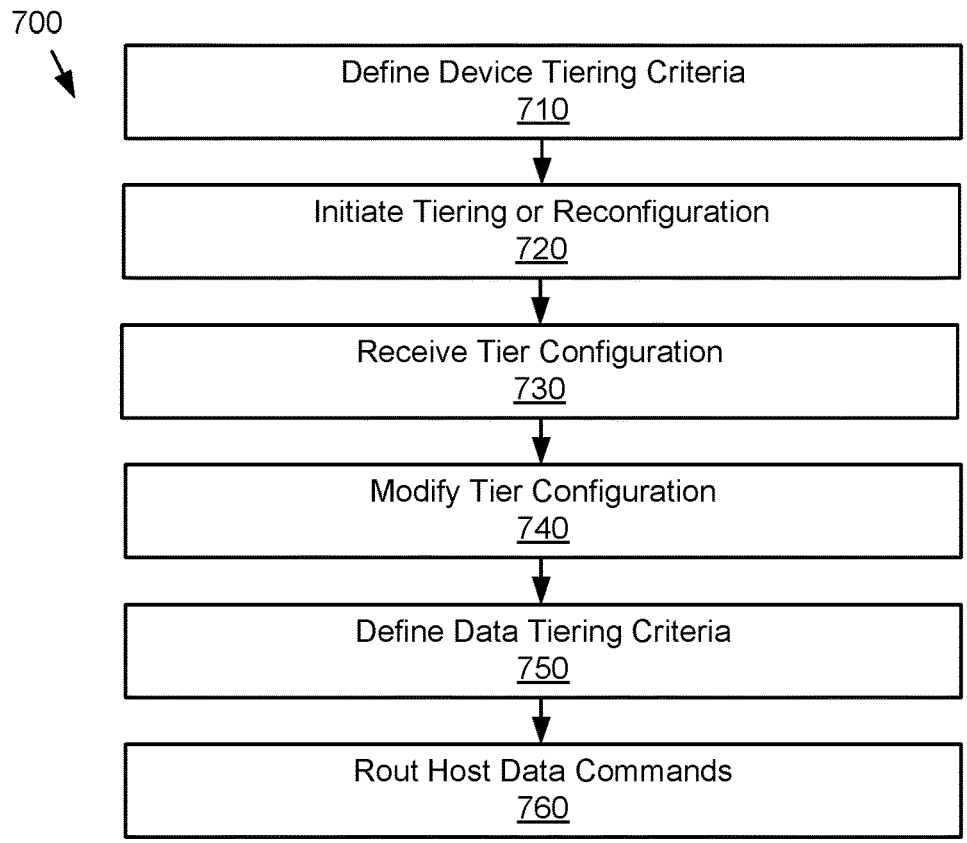
FIG. 7 illustrates an example of a method for routing host data commands using a storage tier configuration.

As shown in FIG. 7, a system component operating within data storage system 100 may be operated according to a tiered data command routing service for routing host data commands to storage devices having the correct performance tier for that data command. For example, a storage controller (e.g. storage controller 110), a host (e.g. host 102), and/or one or more peer storage devices (e.g. storage devices 120) may route host data commands according to the method 700 illustrated by blocks 710-760 of FIG. 7.

At block 710, device performance tiering criteria are defined for a tiered storage array. For example, when a host, server, peer storage device, or other network system using the data storage system needs to initiate or reconfigure a tiered storage array, tiering criteria may need to be defined for use in assigning individual storage devices to appropriately defined storage tiers. In some embodiments, tiering criteria may be defined for the tiered storage array during an initiate setup or configuration of storage system 100 and/or one or more storage devices 120 and the tiering criteria may be stored in a data structure within or accessible to storage devices 120. For example, an administrative user may select device tiering criteria and the selected performance characteristics and value ranges or thresholds may be stored in a tiering criteria definition data structure. In some embodiments, tiering criteria may be provided to storage devices

120 initially, periodically, or on demand through a tiering criteria command that includes complete or updated storage device tiering criteria information.

At block 720, initial tiering and/or reconfiguration of an existing tier configuration may be initiated. For example, an initiate tiering command or a tier reconfiguration command may be sent to one or more storage device to initiate a peer storage device performance tier configuration service. In some embodiments, only a single storage device may receive a command or request to initiate a tier configuration and that storage device will be the tier configuration lead device for organizing the requested tier configuration.

At block 730, a tier configuration, such as an initial tier configuration or an updated tier configuration, may be received from one or more storage devices performing a tier configuration service. For example, a response or status message from a command sent at block 720 may be received containing the tier configuration or a storage location, such as a remotely addressable memory location, where the tier configuration may be accessed.

At block 740, the received tier configuration may be modified. For example, an administrative user interface and/or automated parameters for overriding the device tiering criteria may change the performance tier assigned to one or more storage devices by the tier configuration. In some embodiments, the modified tier configuration may be provided back to the peer storage devices from which the tier configuration was received. For example, a tier configuration modification command may be sent to one or more storage devices.

At block 750, data tiering criteria corresponding to the storage device performance tiers may be defined for allocating host data commands to storage devices having the appropriate performance tier. For example, data tiering criteria may identify specific applications, users, data types, etc. to be handled by each of the defined storage device performance tiers. In some embodiments, these data tiering criteria may be defined at the same time as the device tiering criteria in block 710. In some embodiments, definition of data tiering criteria and application of the data tiering criteria to specific host data commands may be completed independent of the tiered storage array and host data commands may be received with an assigned data tier. For example, a host application may be responsible for designating a performance tier for each host data command and including the assigned data tier in the metadata, session variables, connection, or other parameters related to the host data commands.

At block 760, the performance tier of a destination storage device is matched to the data tier associated with the host data command. For example, a host write command designating data tier 2 may be routed to a storage device assigned to performance tier 2. Routing host data commands may include applying the data criteria to information related to the incoming host data command and/or parsing data tiering information associated with the host data commands. Routing host data commands may also include sequential write, load balancing, and other considerations for allocating host data commands among the set of storage devices within the tiered storage array having the same performance tier.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
a processor;
a memory;
a storage medium configured to store host data;
an interface configured to communicate with a plurality of peer storage devices, wherein each peer storage device of the plurality of peer storage devices includes a peer storage medium configured to store host data;
a peer device registry stored in the memory for identifying the plurality of peer storage devices;
a performance monitor stored in the memory and executable by the processor to monitor at least one performance characteristic for the storage medium;
a self-tiering module stored in the memory and executable by the processor to assign, using the performance monitor and at least one tiering criterion, a self-assigned performance tier from a plurality of performance tiers; and
a data command handler stored in the memory and executable by the processor to perform operations comprising:
receiving host data commands based on a tier configuration, wherein the tier configuration includes:
the self-assigned performance tier; and
a plurality of peer self-assigned performance tiers for the plurality of peer storage devices; and
storing host data in the storage medium.

2. The storage device of claim 1, wherein:
the plurality of performance tiers includes:
a first performance tier; and
a second performance tier; and
the tier configuration assigns:
a first set of the plurality of peer storage devices to the first performance tier based on the at least one performance characteristic meeting the at least one tiering criterion; and
a second set of the plurality of peer storage devices to the second performance tier based on the at least one performance characteristic not meeting the at least one tiering criterion.

3. The storage device of claim 1, wherein the at least one performance characteristic is selected from:
a storage capacity;
a performance class;
an endurance metric; or
an overall health metric.

4. The storage device of claim 1, further comprising:
a configuration publisher configured to send the tier configuration to a storage controller configured to route host data commands to the plurality of peer storage devices based on the tier configuration.

5. The storage device of claim 1, further comprising:
a tier manager stored in the memory and executable by the processor to perform operations comprising:
repeatedly receiving the plurality of peer self-assigned performance tiers from the plurality of peer storage devices; and
repeatedly organizing the plurality of peer storage devices into a plurality of tier configurations, each tier configuration of the plurality of tier configurations assigning each peer storage device of the plurality of peer storage devices to assigned performance tiers selected from the plurality of performance tiers; and
wherein the data command handler is further configured to receive host data commands based on each tier configuration of the plurality of tier configurations for a sequential period of operation.

6. The storage device of claim 5, wherein the tier manager is executable to perform further operations comprising:
receiving a change in the at least one tiering criterion; and
organizing the plurality of peer storage devices into a revised tier configuration among the plurality of tier configurations in response to the change in the at least one tiering criterion.

7. The storage device of claim 5, wherein:
the at least one performance characteristic changes over time for the plurality of peer storage devices; and
the tier manager is further configured to initiate organizing the plurality of peer storage devices into at least one tier configuration of the plurality of tier configurations in response to at least one of:
a reconfiguration request;
a reconfiguration schedule; or
a reconfiguration event.

8. The storage device of claim 1, further comprising:
a peer communication module configured to receive the plurality of peer self-assigned performance tiers from the plurality of peer storage devices through the interface.

9. The storage device of claim 1, further comprising:
a peer communication module configured to communicate the self-assigned performance tier to the plurality of peer storage devices through the interface.

10. A computer-implemented method, comprising:
storing, in a first storage device, storage device identifiers for a plurality of peer storage devices, wherein:
the first storage device includes a storage medium configured to store host data; and
each storage device of the plurality of peer storage devices includes a peer storage medium configured to store host data;
monitoring, in the first storage device, at least one performance characteristic for the first storage device;
assigning, by the first storage device, the first storage device to a self-assigned performance tier from a plurality of performance tiers using:
the at least one performance characteristic; and
at least one tiering criterion based on the at least one performance characteristic;
organizing the first storage device and the plurality of peer storage devices into a tier configuration that includes a plurality of performance tiers, wherein the tier configuration includes a self-assigned performance tier for each storage device of the plurality of peer storage devices; and
receiving host data commands routed to the first storage device and the plurality of peer storage devices based on the tier configuration.

11. The computer-implemented method of claim 10, wherein:
the plurality of performance tiers includes:
a first performance tier; and
a second performance tier; and
the tier configuration assigns:
a first set of the plurality of peer storage devices to the first performance tier based on the at least one performance characteristic meeting the at least one tiering criterion; and
a second set of the plurality of peer storage devices to the second performance tier based on the at least one performance characteristic not meeting the at least one tiering criterion.

12. The computer-implemented method of claim 10, wherein the at least one performance characteristic is selected from:
a storage capacity;
a performance class;
an endurance metric; or
an overall health metric.

13. The computer-implemented method of claim 10, further comprising:

sending the tier configuration to a storage controller configured to route host data commands to the plurality of peer storage devices based on the tier configuration.

14. The computer-implemented method of claim 10, further comprising:
repeatedly querying the plurality of peer storage devices for a plurality of self-assigned performance tiers;
repeatedly organizing the plurality of peer storage devices into a plurality of tier configurations that assign each storage device of the plurality of peer storage devices to assigned performance tiers selected from the plurality of performance tiers; and
receiving host data commands to the plurality of peer storage devices based on each tier configuration of the plurality of tier configurations for a sequential period of operation.

15. The computer-implemented method of claim 14, further comprising:
receiving a change in the at least one tiering criterion; and
organizing the plurality of peer storage devices into a revised tier configuration among the plurality of tier configurations in response to the change in the at least one tiering criterion.

16. The computer-implemented method of claim 14, wherein:
the at least one performance characteristic changes over time for the plurality of peer storage devices; and
initiating at least one iteration of the repeatedly organizing the plurality of peer storage devices is in response to at least one of:
receiving a reconfiguration request;
processing a reconfiguration schedule; or
detecting a reconfiguration event.

17. The computer-implemented method of claim 10, further comprising:
receiving, at the first storage device, the self-assigned performance tier for each storage device of the plurality of peer storage devices; and
storing, in the first storage device, the tier configuration based on the self-assigned performance tier for each storage device of the plurality of peer storage devices.

18. The computer-implemented method of claim 17, further comprising:
communicating the self-assigned performance tier for the first storage device to the plurality of peer storage devices; and
storing the tier configuration in each of the plurality of peer storage devices, wherein the tier configuration includes the self-assigned performance tier for the first storage device.

19. A storage system, comprising:
a plurality of peer storage devices, wherein each of the plurality of peer storage devices comprises:
at least one storage medium;
means for monitoring at least one performance characteristic for the at least one storage medium;
means for storing storage device identifiers for the plurality of peer storage devices;
means for receiving a plurality of tiering criteria for a plurality of performance tiers;
means for self-assigning a performance tier using:
the at least one performance characteristic; and
at least one tiering criterion from the plurality of tiering criteria, wherein the at least one tiering criterion is based on the at least one performance characteristic; and means for communicating the self-assigned performance tier to the plurality of peer storage devices; and means for routing host data commands to the plurality of peer storage devices based on the self-assigned performance tier for each of the plurality of peer storage devices.

20. The storage system of claim 19, further comprising:

means for generating a tier configuration based on the self-assigned performance tier from each of the plurality of peer storage devices, wherein the tier configuration is used by a storage controller for routing host data commands.

\* \* \* \* \*